United States Patent
Chen et al.

(10) Patent No.: US 10,422,657 B2
(45) Date of Patent: Sep. 24, 2019

(54) NOTIFICATION OF PROXIMAL POINTS OF INTEREST

(71) Applicant: International Business Machines Corporation, Armonk, NY (US)

(72) Inventors: Li-Ju Chen, Taipei (TW); Jeff H C Kuo, Taipei (TW); Chih-Wen Su, Taipei (TW); Ying-Chen Yu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 14/802,190

(22) Filed: Jul. 17, 2015

(65) Prior Publication Data
US 2017/0016736 A1   Jan. 19, 2017

(51) Int. Cl.
*G01C 21/34* (2006.01)
*G01C 21/36* (2006.01)

(52) U.S. Cl.
CPC ..... *G01C 21/3682* (2013.01); *G01C 21/3644* (2013.01); *G01C 21/3679* (2013.01)

(58) Field of Classification Search
CPC .. H04W 4/206; H04W 84/12; G01C 21/3679; G01C 21/3476; G01C 21/3644; G01C 21/3682; G06Q 10/02; G06Q 30/02; G06Q 10/1053; G06Q 10/20; G06Q 20/04; G06Q 20/12; G06Q 20/20; G06Q 20/32; G06Q 20/03
See application file for complete search history.

(56) References Cited

U.S. PATENT DOCUMENTS

| | | | | |
|---|---|---|---|---|
| 6,845,321 B1 * | 1/2005 | Kerns | ................ | G01C 21/3679 340/988 |
| 7,647,166 B1 * | 1/2010 | Kerns | ................ | G01C 21/3679 340/988 |
| 8,589,069 B1 * | 11/2013 | Lehman | ................ | G01C 21/20 340/995.1 |

(Continued)

FOREIGN PATENT DOCUMENTS

WO    2012159093 A2    11/2012

OTHER PUBLICATIONS

Tsagklis, Ilias. "Java Code Geeks", Android Proximity Alerts Tutorial, Jan. 10, 2011, 21 pages, <http://www.javacodegeeks.com/2011/01/android-proximity-alerts-tutorial.html>.

(Continued)

*Primary Examiner* — Jelani A Smith
*Assistant Examiner* — Donald J Wallace
(74) *Attorney, Agent, or Firm* — Adolph Bohnstedt; Arnold B. Bangali

(57) ABSTRACT

One or more processors analyze at least one first user input. One or more processors determine one or more interests of a first user based, at least in part, on the at least one first user input. One or more processors determine a proximity of the first user to one or more points of interest within a first threshold distance of the first user while the first user is mobile. One or more processors match at least one interest of the first user with one or more interests associated with a point of interest of the one or more points of interest. One or more processors provide a notification that the first user is within the first threshold distance of the point of interest.

6 Claims, 6 Drawing Sheets

(56) References Cited

U.S. PATENT DOCUMENTS

| | | | |
|---|---|---|---|
| 8,666,434 B1* | 3/2014 | Taylor | G01S 19/39 |
| | | | 455/404.2 |
| 8,930,162 B2 | 1/2015 | Wang et al. | |
| 9,411,422 B1* | 8/2016 | McClendon | G06F 3/016 |
| 2004/0107049 A1* | 6/2004 | White | G01S 19/14 |
| | | | 701/469 |
| 2006/0229807 A1 | 10/2006 | Sheha et al. | |
| 2009/0281722 A1* | 11/2009 | Bitonti | G01C 21/3679 |
| | | | 701/408 |
| 2010/0041378 A1* | 2/2010 | Aceves | H04L 67/306 |
| | | | 455/414.1 |
| 2011/0128144 A1* | 6/2011 | Baron, Sr. | G01W 1/00 |
| | | | 340/539.3 |
| 2011/0151898 A1* | 6/2011 | Chandra | H04W 4/02 |
| | | | 455/466 |
| 2012/0023088 A1 | 1/2012 | Cheng et al. | |
| 2012/0086549 A1* | 4/2012 | Barnes, Jr. | G06Q 10/1053 |
| | | | 340/5.61 |
| 2012/0096490 A1* | 4/2012 | Barnes, Jr. | G06Q 10/02 |
| | | | 725/34 |
| 2012/0258735 A1* | 10/2012 | Monteverde | H04W 4/021 |
| | | | 455/456.3 |
| 2012/0295639 A1* | 11/2012 | Fitoussi | H04W 4/043 |
| | | | 455/456.3 |
| 2013/0006521 A1* | 1/2013 | Needham | G01C 21/343 |
| | | | 701/426 |
| 2013/0073988 A1* | 3/2013 | Groten | G06Q 30/02 |
| | | | 715/753 |
| 2013/0110633 A1* | 5/2013 | Waldman | G01C 21/20 |
| | | | 705/14.58 |
| 2014/0210256 A1* | 7/2014 | Raats | H02J 9/00 |
| | | | 307/9.1 |
| 2014/0266802 A1* | 9/2014 | Love | G08G 1/144 |
| | | | 340/932.2 |
| 2014/0280231 A1* | 9/2014 | Paruchuri | G06F 17/30038 |
| | | | 707/749 |
| 2015/0006289 A1 | 1/2015 | Jakobson et al. | |
| 2015/0019125 A1* | 1/2015 | Mazanec | G01C 21/3682 |
| | | | 701/410 |
| 2015/0057837 A1* | 2/2015 | Moore, Jr. | G06Q 10/02 |
| | | | 701/2 |
| 2015/0223201 A1* | 8/2015 | Joshi | G01C 21/362 |
| | | | 455/3.06 |
| 2015/0234636 A1* | 8/2015 | Barnes, Jr. | G06F 3/167 |
| | | | 715/728 |
| 2015/0330805 A1* | 11/2015 | Cho | H04W 4/02 |
| | | | 701/428 |
| 2016/0014176 A1* | 1/2016 | Ariav | H04L 65/60 |
| | | | 709/219 |
| 2016/0360336 A1* | 12/2016 | Gross | H04W 4/001 |
| 2016/0360382 A1* | 12/2016 | Gross | G06F 3/0488 |
| 2018/0124559 A1* | 5/2018 | Sahadi | H04W 4/02 |

OTHER PUBLICATIONS

Wortham, Jenna. "New Apps Connect to Friends Nearby", Mar. 8, 2012, The New York Times, copyright 2015 The New York Times Company, 4 pages, <http://www.nytimes.com/2012/03/09/technology/new-apps-connect-to-friends-nearby.html?pagewanted=all&_r=2>.

* cited by examiner

NOTIFICATION OF PROXIMAL POINTS OF INTEREST

BACKGROUND OF THE INVENTION

The present invention relates generally to the field of point of interest notification, and more particularly to the notification of a computing device user of proximal points of interest.

Electronic maps of most of the developed world are available from a number of electronic map providers. Metadata embedded in many of these electronic maps includes the whereabouts of numerous points of interest such as businesses, parks, railway and bus stations, stadiums, government offices, etc. In addition, there are several ways that a computing device may be tracked on an electronic map. Thus, electronic maps can show a user with a device his or her proximity to many different points of interest. In fact, a user of a computing device can even track the location of other users with computing devices using electronic maps. Hence, even a person can be a point of interest in some cases.

SUMMARY

Embodiments of the present invention provide a method, system, and program product for notification of proximal points of interest. One or more processors analyze at least one first user input. One or more processors determine one or more interests of a first user based, at least in part, on the at least one first user input. One or more processors determine a proximity of the first user to one or more points of interest within a first threshold distance of the first user while the first user is mobile. One or more processors match at least one interest of the first user with one or more interests associated with a point of interest of the one or more points of interest. One or more processors provide a notification that the first user is within the first threshold distance of the point of interest.

DETAILED DESCRIPTION

Embodiments of the present invention recognize that many individuals pass by places, people, and things that are of interest to them (points of interest or POIs) without realizing it. Embodiments of the present invention provide a method, program product, and system to notify individuals that they are near one or more POIs.

The present invention will now be described in detail with reference to the Figures.

Figure 1:
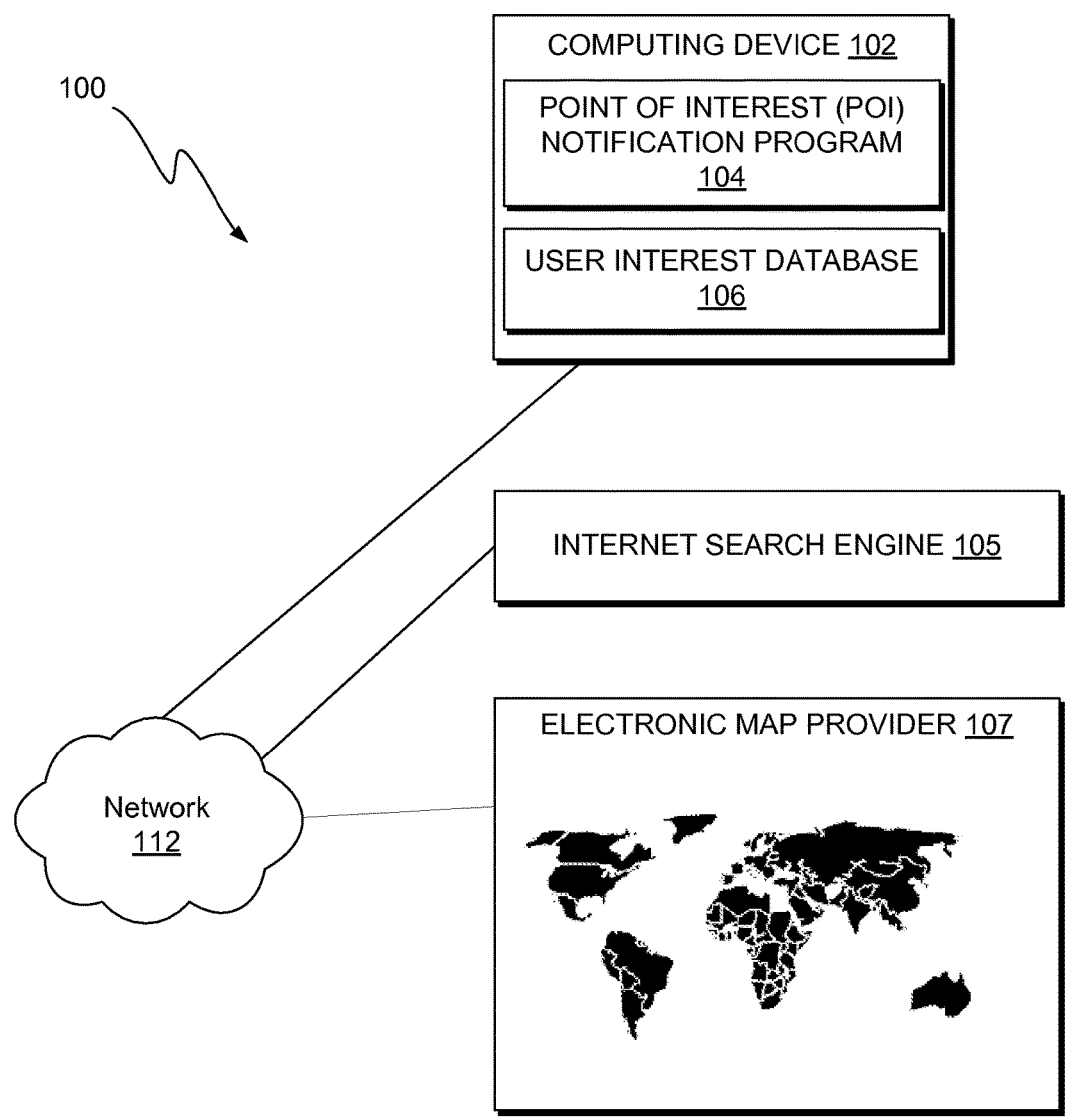
FIG. 1 is a functional block diagram illustrating a point of interest (POI) notification environment, in accordance with an exemplary embodiment of the present invention.

FIG. 1 is a functional block diagram illustrating a POI notification environment, generally designated 100, in accordance with one embodiment of the present invention. POI notification environment 100 includes computing device 102, internet search engine 105, and electronic map provider 107 connected over network 112. Computing device 102 includes POI notification program 104 and user interest database 106.

In various embodiments of the present invention, computing device 102 is a computing device that can be a standalone device, a mobile device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to user interest database 106, network 112, internet search engine 105, and electronic map provider 107 and is capable of executing POI notification program 104. Computing device 102 may include internal and external hardware components, as depicted and described in further detail with respect to FIG. 6.

In this exemplary embodiment, POI notification program 104 and user interest database 106 are stored on computing device 102. However, in other embodiments, POI notification program 104 and user interest database 106 may be stored externally and accessed through a communication network, such as network 112. Network 112 can be, for example, a local area network (LAN), a wide area network (WAN) such as the Internet, or a combination of the two, and may include wired, wireless, fiber optic or any other connection known in the art. In general, network 112 can be any combination of connections and protocols that will support communications between POI notification program 104, user interest database 106, internet search engine 105, and electronic map provider 107, in accordance with a desired embodiment of the present invention.

In exemplary embodiments, POI notification program 104 determines user interests and stores these interests in user interest database 106. POI notification program 104 tracks the user position when the user is mobile and notifies the user when a POI with associated interests that match one or more of the user interests is a threshold distance from the user. POI notification program 104 also allows the user to share his or her interests with other users.

In exemplary embodiments, internet search engine 105 is one or more of several known internet search engines and facilitates the ability of POI notification program 104 to determine one or both of: the user interests and the interests associated with a given POI.

In exemplary embodiments, electronic map provider 107 is one or more of several known electronic map providers and provides map data to POI notification program 104 that includes metadata such as POI locations and the POI proximity to computing device 102.

Figure 2:
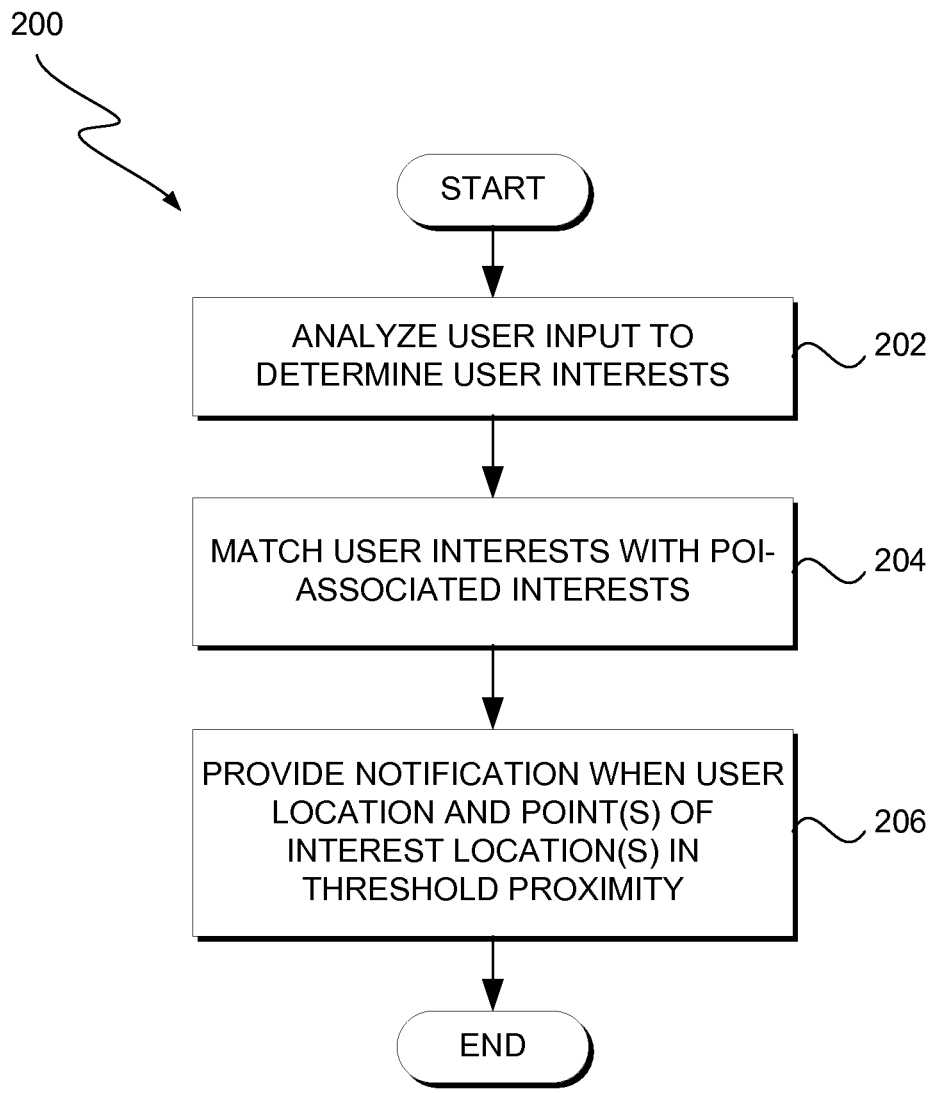
FIG. 2 illustrates operational processes for determining user interests, matching the user interests with POIs, and providing a notification when the user location is at a threshold proximity to the POIs, on a computing device within the environment of FIG. 1, in accordance with an exemplary embodiment of the present invention.

FIG. 2 illustrates operational processes 200 for determining user interests, matching the user interests with POIs, and providing a notification when the user location is at a threshold proximity to the POIs, on a computing device within the environment of FIG. 1, in accordance with an exemplary embodiment of the present invention.

In step 202, POI notification program 104 analyzes user input into computing device 102 in order to determine the user interests. In various embodiments, POI notification program 104 tracks and records the user input into websites on the internet such as social websites, merchant websites, email websites, news websites, video websites, etc. POI notification program 104 tracks and records data such as input word content, websites visited, objects and videos on the internet at which the user looks, visited website content, etc. Further details of the processes used by POI notification program 104 in determining user interests are described in FIG. 3.

In step 204, POI notification program 104 matches user interests with POI-associated interests when the user is mobile. As used herein referring to a user, "mobile" includes scenarios where the user is using a computing device that is readily transported from place to place and is designed to be taken with the user when the user is, for example, traveling, running errands, or eating out. Examples of mobile computing devices include, but are not limited to one or more of: a laptop, cellular phone, computing watch or other computing device adornment, etc. In one example, a user is mobile when they take a laptop to an internet caé. In another example, a user is mobile when they are traveling to various locations with a cell phone or watch connected to, or connectable to, the internet through a WiFi source or a service provider data plan. In various embodiments, POIs are locations provided to the user via electronic map provider 107. The interests associated with the POIs are derived from metadata and other data such as data provided by internet search engine 105. Further details of the processes used by POI notification program 104 in matching user interests with POIs are described in FIG. 4.

In step 206, POI notification program 104 provides a notification when the user location is within a threshold proximity of one or more POIs. In various embodiments, the notification is directed at the user by POI notification program 104 through a computing device 102 user interface. In one embodiment, if the number of POIs exceeds a threshold number, POI notification program 104 filters the POI "hits" to a limited number based on various parameters. In one example, POI notification program 104 uses the number of matches between the user interests and the interests associated with various POIs to determine which POIs are shown to the user. In other words, the larger the number of matches between the user interests and interests associated with a POI, the more likely it is that POI notification program 104 will display that POI in notification step 206. In another example, POI notification program 104 filters the display of POIs by a second threshold proximity to the user, which is a shorter distance than the first threshold proximity. In this example, the farther away the POI is, the less likely it is that the POI will be displayed to the user.

POI notification program 104 can use other parameters to filter POIs that exceed a threshold number. In one embodiment, POI "hits" are filtered by the length of time since the user expressed interest in the user interest(s) that match the interests associated with the POI. For example, a user expressed interest in buying a grill six months ago and a board game two weeks ago. Based on the different lengths of time since the user expressed an interest in either item, POI notification program 104 only displays a POI where the user can buy a board game and not a POI where the user can purchase a grill. In this embodiment, a user optionally specifies the length of time that POI notification program 104 will retain a user interest in user interest database 106 so that the user will not be shown POIs that the user no longer has any interest in. In another embodiment, POI "hits" are filtered so that redundancy is avoided. For example, user interest database 106 contains ten matching user interests. There are twenty POIs that are within the threshold proximity of the user and the POIs have interests associated with them that match at least one of the ten user interests. Seven of the POIs have associated interests that match just one of the ten matching user interests. Each of the other nine matching user interests have no more than two POIs that have matching associated interests. POI notification program 104 preferably filters out some of the seven POIs that match the one user interest redundantly. In another embodiment, POI notification program 104 filters out POI "hits" when it determines that the user is ignoring these POIs, thereby indicating that the user interest that was matched by the POIs is no longer a user interest. In this embodiment, user interest database 106 is modified to erase that particular user interest.

In various embodiments, the notification(s) are also broadcast by POI notification program 104 to POIs in the user area. In one embodiment, the broadcast is in lieu of notification(s) to the user because, for example, the number of POIs within the threshold proximity exceeds a threshold number. In another example, the notification is a broadcast because the user has set the notification to a broadcast mode. In one scenario, the user is in a location and an acquaintance who has a second computing device that is executing POI notification program 104 is within the threshold proximity of the user. POI notification program 104 on one or both devices of the user and acquaintance broadcasts a notification letting either or both the user and acquaintance know they are within the threshold proximity of each other.

Figure 3:
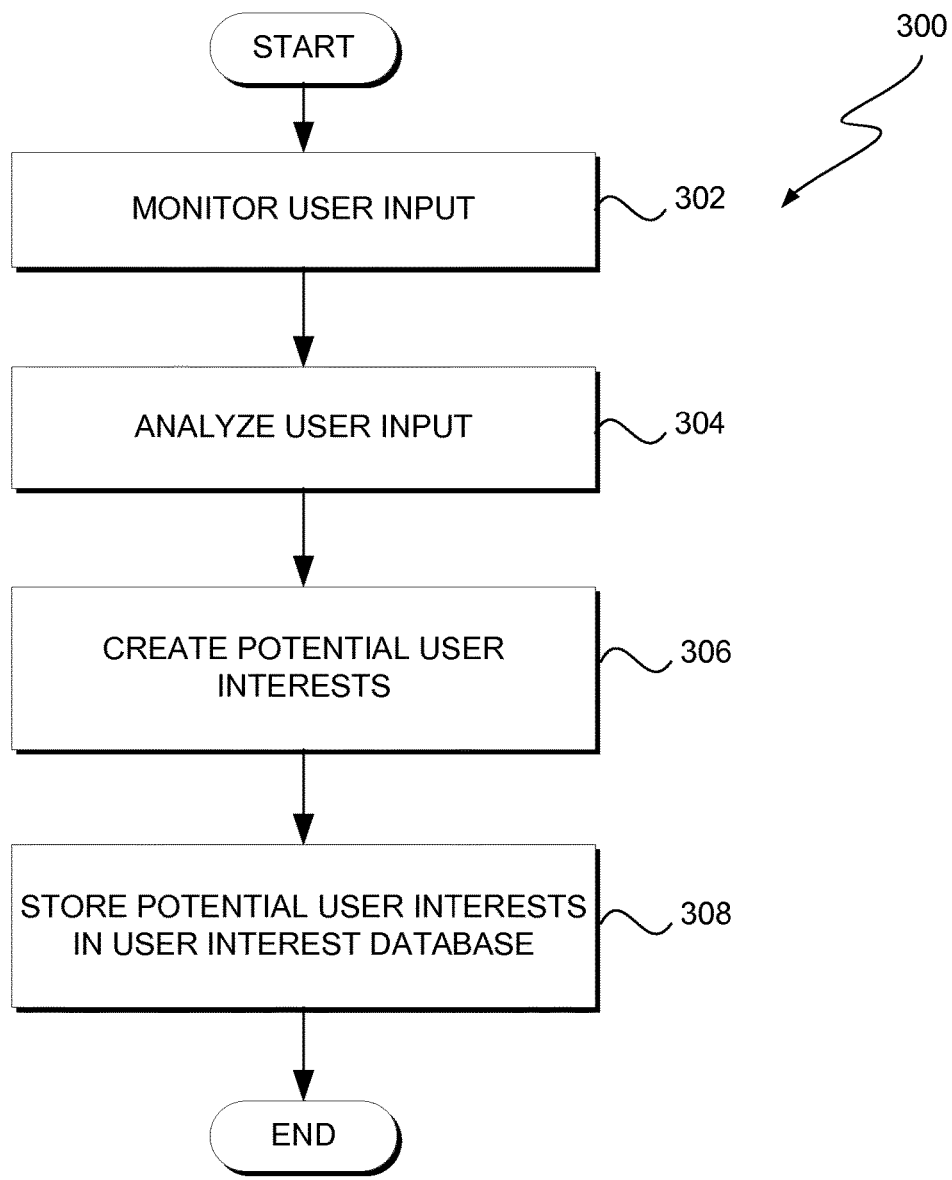
FIG. 3 illustrates operational processes for determining user interests, on a computing device within the environment of FIG. 1, in accordance with an exemplary embodiment of the present invention.

FIG. 3 illustrates operational processes 300 for determining user interests, on a computing device within the environment of FIG. 1, in accordance with an exemplary embodiment of the present invention.

In step 302, POI notification program 104 monitors user input into computing device 102. In various embodiments, a keylogging subprogram in POI notification program 104 records the user keystrokes. As discussed above, POI notification program 104 tracks websites visited by the user and, using machine learning, gains knowledge of the user interests by recording user input on these websites. For example, POI notification program 104 tracks user input while visiting merchant websites in order to learn what products or services the user may be interested in. In another example, POI notification program 104 tracks and records user input when the user visits news websites in order to learn what current events interest the user. In yet another example, POI notification program 104 records information relating to online videos the user watches in order to learn what topics interest the user.

In step 304, POI notification program 104 analyzes the user input in order to determine the user interests. In various embodiments, the keylogging subprogram in POI notification program 104 determines text input by the user and creates keyword lists, which provide a basis for learning the user interests. The analysis of user internet usage also provides information regarding the user interests. For example, user perusal of merchandise from a merchant website provides information regarding goods the user is interested in purchasing. In another example, analysis of user input on a social website or email website provides information regarding relationships with other individuals.

In step 306, POI notification program 104 creates potential user interests based on the analysis of the user input. In various embodiments, user interests are based in part on the words that the keylogging subprogram records. For example, multiple uses of the terms "bread," "milk," "ice cream," and "hamburger" potentially indicates a user interest in restaurants or grocery stores. In another example, multiple uses of the terms "spark plugs," "air filter," "oil filter," and "oil" potentially indicates a user interest in automobile repair or automobile parts stores. In another example, the use of the terms "beach towel," "sandals," "sunscreen," and "beach ball" potentially indicates a user interest in a vacation on a seashore.

In various embodiments, POI notification program 104 creates potential user interests after analysis of internet websites visited by the user. For example, a user visit to a merchant website that sells golf clubs potentially indicates the user has an interest in buying one or more golf clubs or other golfing equipment. In another example, a user posting messages on a social website that focuses on hiking indicates the user has an interest in hiking. In yet another example, a user perusing online videos of skydiving potentially indicates the user has an interest in skydiving.

In step 308, POI notification program 104 stores the potential user interests in user interest database 106. For the examples discussed above, user interests stored in user interest database 106 include restaurants, grocery stores, automobile maintenance, automobile parts, a vacation on the seashore, purchasing golf equipment, hiking, and skydiving.

Figure 4:
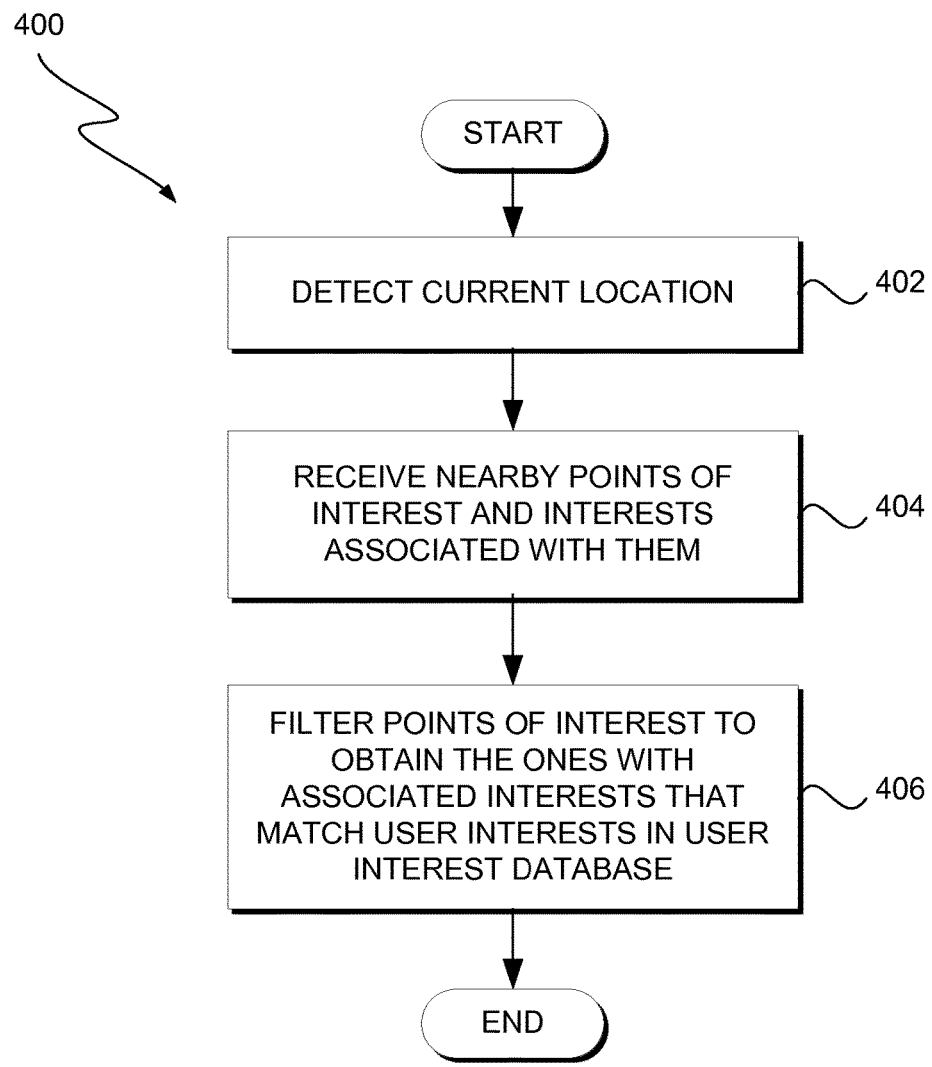
FIG. 4 illustrates operational processes for matching the user interests with POIs, on a computing device within the environment of FIG. 1, in accordance with an exemplary embodiment of the present invention.

FIG. 4 illustrates operational processes 400 for matching the user interests with interests associated with POIs, on a computing device within the environment of FIG. 1, in accordance with an exemplary embodiment of the present invention.

In step 402, POI notification program 104 detects the user current location. In various embodiments, computing device 102 includes a global positioning system (GPS) receiver enabling device tracking via satellite. In other embodiments, the position of computing device 102 (and, hence, the user) is determined by triangulation of wireless signals emanating from, for example, wireless routers or cellular towers.

In step 404, POI notification program 104 receives nearby POIs and the interests associated with them from one or both electronic map provider 107 and internet search engine 105. In various embodiments, electronic map provider 107 provides a map and the location of the user on the map. The POIs within a threshold proximity are also provided by electronic map provider 107 along with associated metadata that indicates interests associated with the POIs. Interests associated with the POIs are also determined from internet searches via internet search engine 105.

In an example, POI notification program 104 has a user-selected threshold proximity of one mile. POI notification program 104 requests all POIs and associated metadata from electronic map provider 107 within a one mile radius of the user location. POI notification program receives the available data from electronic map provider 107 and does keyword searching of the supplied data using internet search engine 105 in order to determine interests associated with POIs that are within the one mile radius.

In step 406, POI notification program 104 filters the points of interest to obtain POI(s) that have interests associated with them that match the user interests in user interest database 106. POI notification program 104 searches user interest database 106 for interest terms that match terms found in the metadata associated with the POIs supplied by electronic map provider 107 as well as data retrieved from searches using internet search engine 105. In exemplary embodiments, POI notification program 104 employs Boolean searches using both the user interests contained in user interest database and keywords contained in the electronic map provider 107 data to find matches between the user interests and the POIs with the threshold proximity. For example, POI notification program 104 will use logic connectors such as "and" to retrieve data showing whether a user interest and an interest associated with a POI are related.

Figure 5:
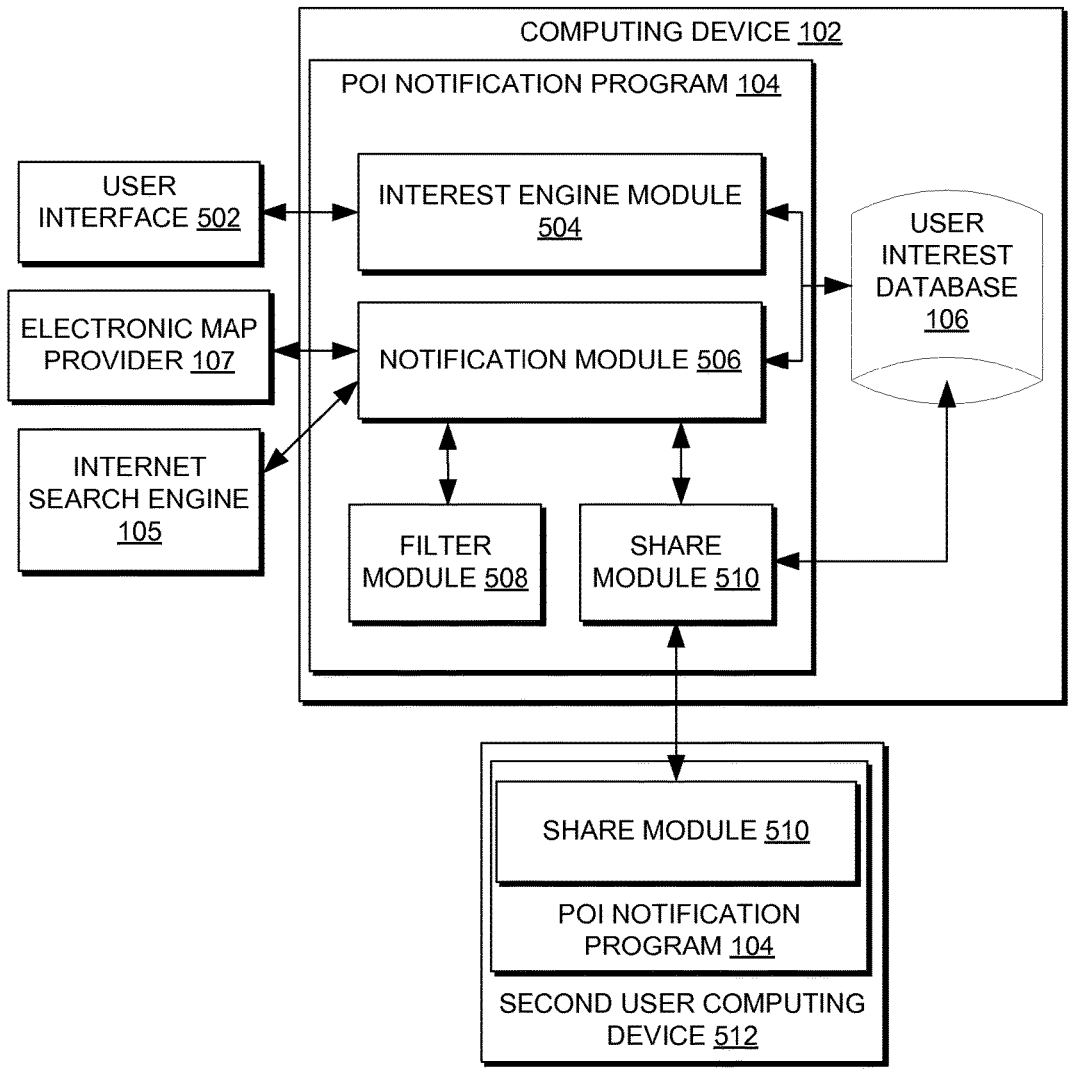
FIG. 5 is a functional block diagram illustrating components of the POI notification program within the on the computing device within the environment of FIG. 1, in accordance with an exemplary embodiment of the present invention.

FIG. 5 is a functional block diagram illustrating components of POI notification program 104 on computing device 102 within the environment of FIG. 1, in accordance with an exemplary embodiment of the present invention.

Interest engine module 504 monitors and analyzes user input via user interface 502 and determines what the user interests are. In various embodiments, interest engine module 504 is automatically launched when user input begins. Interest engine module 504 determines user interests by monitoring and analyzing, for example, websites visited or keylogging data. Interest engine module 504 then stores the user interests in user interest database 106.

Notification module 506 receives map location and POIs along with POI metadata from electronic map provider 107. Notification module 506 conducts searches via internet search engine 105 to obtain more interests associated with POIs provided by electronic map provider 107. Notification module 506 searches user interest database 106 for user interests that match the interests associated with the POIs provided by electronic map provider 107.

Filter module 508 sorts and optionally filters the POIs with associated interests that match the user interests. Filter module 508 displays the sorted and optionally filtered POIs to the user.

Share module 510 allows a user to share their interests with other users. In various embodiments, a first user sends a request to a second user asking if the second user would like to share interests with the first user. In some embodiments, the two users will also determine how many and what kind of interests they will share. Upon agreement that interests will be shared by the users, share module 510 executes the transfer of interests between the users.

Figure 6:
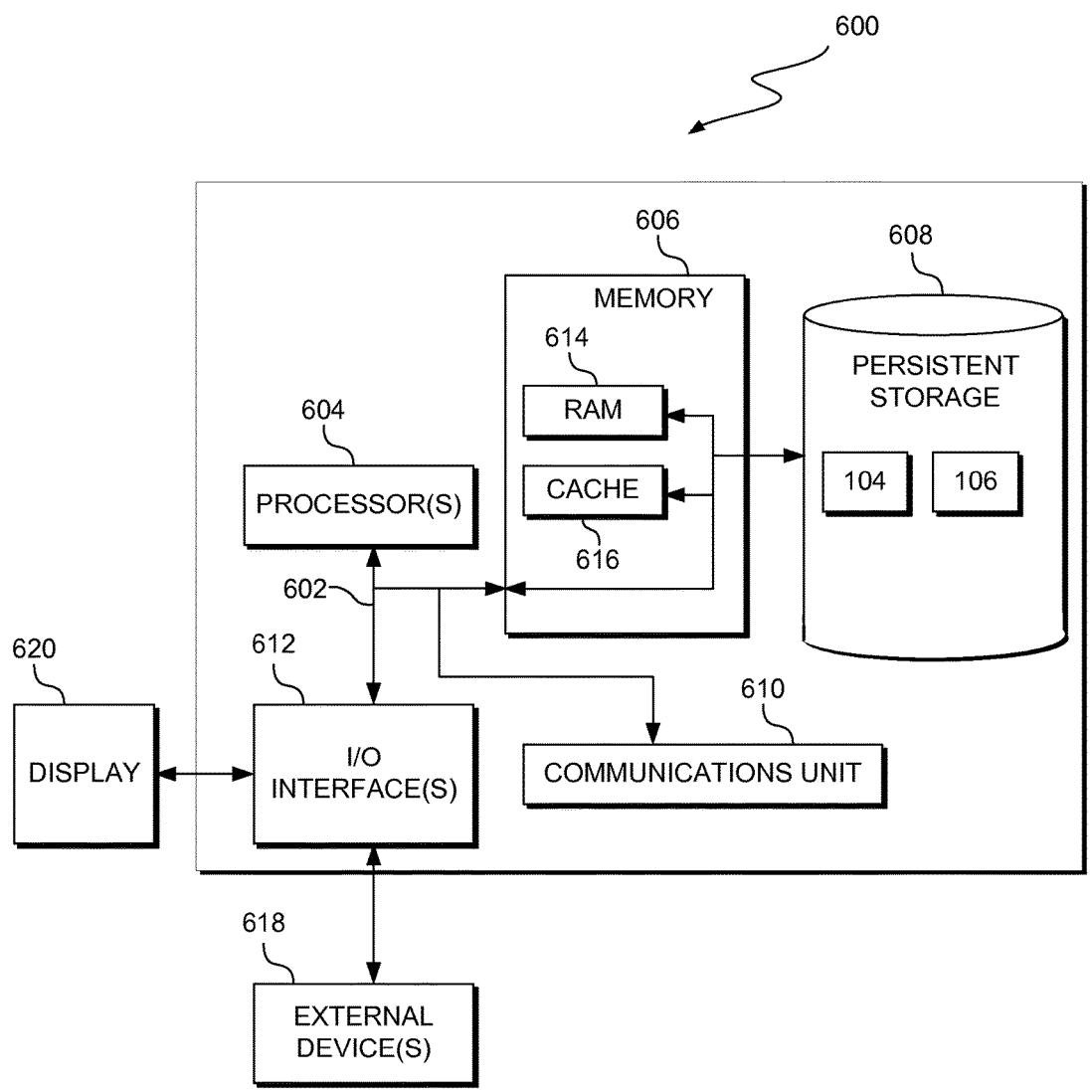
FIG. 6 depicts a block diagram of components of the computing device executing the POI notification program, in accordance with an exemplary embodiment of the present invention.

FIG. 6 depicts a block diagram, 600, of components of computing device 102, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 102 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

User interest database 106 and POI notification program 104 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 112. In these examples, communications unit 610 includes one or more network interface cards. Communications unit 610 may provide communications through the use of either or both physical and wireless communications links. User interest database 106 and POI notification program 104 may be downloaded to persistent storage 608 through communications unit 610.

I/O interface(s) 612 allows for input and output of data with other devices that may be connected to computing device 102. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., user interest database 106 and POI notification program 104, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk" and the like may be subject to trademark rights in various jurisdictions throughout the world and are used here only in reference to the products or services properly denominated by the marks to the extent that such trademark rights may exist.

What is claimed is:

1. A method comprising:
    analyzing, by one or more processors, a first user input into a computing device, wherein at least in part, a keylogging subprogram tracks the first user input, wherein analyzing the first user input includes continuously monitoring and tracking internet usage of the user, including tracking user input in one or more websites, and wherein analyzing the first user input further includes using machine learning to gain knowledge of one or more interests of the first user based on the first user input;
    determining, by the one or more processors, the one or more interests of the first user based, at least in part, on the first user input into the computing device;
    determining, by the one or more processors, a proximity of the first user to one or more points of interest that match the first user input into the computing device and are within a first threshold distance of the first user while the first user is mobile;
    matching, by the one or more processors, at least one interest of the one or more interests of the first user with one or more interests associated with at least one point of interest of the one or more points of interest;
    notifying, by the one or more processors, the first user that the first user is within the first threshold distance of the point of interest, wherein the notification includes a broadcast message, wherein the broadcast message is sent to both the first user and a second user that is within a threshold proximity of the first user;
    filtering, by the one or more processors, the at least one point of interest, based on a predetermined length of time since the at least one interest of the first user matched the at least one point of interest, wherein the first user specifies the length of time that the first user's interest is retained before being filtered, wherein the filtered point of interest is terminated if it redundantly matches the at least one interest of the first user, and wherein the terminated filtered point of interest indicates that the first user is no longer interested in the at least one interest of the one or more interests of the first user; and
    sorting, by the one or more processors, a plurality of points of interest using one or more of: a second threshold distance of the first user from the at least one of the one or more points of interest, a threshold number of matches between the one or more interests of the first user and the one or more interests associated with the at least one of the one or more points of interest, a length of time since a matching first user interest was determined, a threshold number of points of interest that match the one or more interests of the first user with substantial similarity, and a threshold number of instances whereby the first user has ignored a notification of a point of interest that matched at least one of the one or more interests of the first user.

2. The method of claim 1, wherein the one or more points of interest include one or more of i) a person, ii) a place, iii) an object, and iv) an activity that are determined to be of interest to the first user.

3. A computer program product comprising:
    one or more computer-readable storage media and program instructions stored on at least one of the one or more computer-readable storage media, the program instructions comprising:
    program instructions to analyze a first user input into a computing device, wherein at least in part, a keylogging subprogram tracks the first user input, wherein analyzing the first user input includes continuously monitoring and tracking internet usage of the user, including tracking user input in one or more websites, and wherein analyzing the first user input further includes using machine learning to gain knowledge of one or more interests of the first user based on the first user input;

program instructions to determine the one or more interests of the first user based, at least in part, on the first user input into the computing device;

program instructions to determine a proximity of the first user to one or more points of interest that match the first user input into the computing device and are within a first threshold distance of the first user while the first user is mobile;

program instructions to match at least one interest of the one or more interests of the first user with one or more interests associated with at least one point of interest of the one or more points of interest;

program instructions to notify the first user that the first user is within the first threshold distance of the at least one point of interest, wherein the notification includes a broadcast message, wherein the broadcast message is sent to both the first user and a second user that is within a threshold proximity of the first user;

program instructions to filter the at least one point of interest, based on a predetermined length of time since the at least one interest of the first user matched the at least one point of interest, wherein the first user specifies the length of time that the first user's interest is retained before being filtered, wherein the filtered point of interest is terminated if it redundantly matches the at least one interest of the first user, and wherein the terminated filtered point of interest indicates that the first user is no longer interested in the at least one interest of the one or more interests of the first user; and program instructions to sort a plurality of points of interest using one or more of: a second threshold distance of the first user from the at least one of the one or more points of interest, a threshold number of matches between the one or more interests of the first user and the one or more interests associated with the at least one of the one or more points of interest, a length of time since a matching first user interest was determined, a threshold number of points of interest that match the one or more interests of the first user with substantial similarity, and a threshold number of instances whereby the first user has ignored a notification of a point of interest that matched at least one of the one or more interests of the first user.

4. The computer program product of claim 3, wherein the one or more points of interest include one or more of i) a person, ii) a place, iii) an object, and iv) an activity that are determined to be of interest to the first user.

5. A computer system comprising:
one or more computer processors;
one or more computer-readable storage media; and
program instructions stored on at least one of one or more computer-readable storage media for execution by at least one of the one or more processors, the program instructions comprising:

program instructions to analyze a first user input into a computing device, wherein at least in part, a keylogging subprogram tracks the first user input, wherein analyzing the first user input includes continuously monitoring and tracking internet usage of the user, including tracking user input in one or more websites, and wherein analyzing the first user input further includes using machine learning to gain knowledge of one or more interests of the first user based on the first user input;

program instructions to determine the one or more interests of the first user based, at least in part, on the first user input into the computing device;

program instructions to determine a proximity of the first user to one or more points of interest that match the first user input into the computing device and are within a first threshold distance of the first user while the first user is mobile;

program instructions to match at least one interest of the one or more interests of the first user with one or more interests associated with at least one point of interest of the one or more points of interest;

program instructions to notify the first user that the first user is within the first threshold distance of the point of interest, wherein the notification includes a broadcast message, wherein the broadcast message is sent to both the first user and a second user that is within a threshold proximity of the first user;

program instructions to filter the at least one point of interest, based on a predetermined length of time since the at least one interest of the first user matched the at least one point of interest, wherein the first user specifies the length of time that the first user's interest is retained before being filtered, wherein the filtered point of interest is terminated if it redundantly matches the at least one interest of the first user, and wherein the terminated filtered point of interest indicates that the first user is no longer interested in the at least one of the one or more interests of the first user; and program instructions to sort a plurality of points of interest using one or more of: a second threshold distance of the first user from the at least one of the one or more points of interest, a threshold number of matches between the one or more interests of the first user and the one or more interests associated with the at least one of the one or more points of interest, a length of time since a matching first user interest was determined, a threshold number of points of interest that match the one or more interests of the first user with substantial similarity, and a threshold number of instances whereby the first user has ignored a notification of a point of interest that matched at least one of the one or more interests of the first user.

6. The computer system of claim 5, wherein the one or more points of interest include one or more of i) a person, ii) a place, iii) an object, and iv) an activity that are determined to be of interest to the first user.

* * * * *